US009703478B2

(12) United States Patent
Yang

(10) Patent No.: US 9,703,478 B2
(45) Date of Patent: Jul. 11, 2017

(54) CATEGORY-BASED KEYBOARD

(71) Applicant: Wenlong Yang, Shanghai (CN)

(72) Inventor: Wenlong Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/128,931

(22) PCT Filed: Jul. 19, 2013

(86) PCT No.: PCT/CN2013/079662

§ 371 (c)(1),
(2) Date: Dec. 23, 2013

(87) PCT Pub. No.: WO2015/006964

PCT Pub. Date: Jan. 22, 2015

(65) Prior Publication Data

US 2015/0026625 A1 Jan. 22, 2015

(51) Int. Cl.
*G06F 3/0488* (2013.01)
*G06F 3/0484* (2013.01)
*G06F 3/02* (2006.01)

(52) U.S. Cl.
CPC ........ *G06F 3/04886* (2013.01); *G06F 3/0216* (2013.01); *G06F 3/04842* (2013.01)

(58) Field of Classification Search
CPC ......................... G06F 3/04842; G06F 3/04886
See application file for complete search history.

(56) References Cited

U.S. PATENT DOCUMENTS

| | | | | |
|---|---|---|---|---|
| 2010/0073302 | A1* | 3/2010 | Ritzau | G06F 3/0233 345/173 |
| 2012/0306769 | A1* | 12/2012 | Zhu | G06F 3/04883 345/173 |
| 2013/0113714 | A1 | 5/2013 | Mao | |

(Continued)

FOREIGN PATENT DOCUMENTS

| | | | |
|---|---|---|---|
| CN | 102043474 | A | 5/2011 |
| KR | 10-2010-0002835 | A | 1/2010 |

OTHER PUBLICATIONS

International Search Report and Written Opinion received for PCT Patent Application No. PCT/CN2013/079662, mailed on Apr. 25, 2014, 13 pages.

*Primary Examiner* — Amy Ng
*Assistant Examiner* — Tan Tran
(74) *Attorney, Agent, or Firm* — Jordan IP Law, LLC

(57) ABSTRACT

Apparatuses, systems, media, and/or methods may involve a keyboard and/or a selection of an element thereof. The keyboard may include a keyboard configuration, which may have one or more elements such as a character, a key, and/or functionality for the key. The key may include no characters, one or more characters, and/or one or more sets of characters. The architecture of the keyboard configuration may be based on one or more categories, such as a hand category and/or a finger category. In addition, a touch area may be recognized, which may be formed between a user digit and the key of the keyboard configuration. The category associated with the touch area may be determined, wherein the character, the key, and/or the functionality for the key may be selected based on the category.

18 Claims, 5 Drawing Sheets

(56) References Cited

U.S. PATENT DOCUMENTS

| | | | | |
|---|---|---|---|---|
| 2013/0257732 | A1* | 10/2013 | Duffield | G06F 3/0236 345/168 |
| 2014/0032300 | A1* | 1/2014 | Zhang | G06Q 30/0207 705/14.35 |

* cited by examiner

CATEGORY-BASED KEYBOARD

BACKGROUND

Embodiments may generally relate to keyboards. More particularly, embodiments may relate to the use of categories to configure keyboards.

A conventional keyboard may include a configuration of keys, wherein the keys may be relatively small. For example, the keyboard may include a plurality of characters assigned to a single key, wherein the user may be required to repeatedly click the key to select a desired character. Such an approach may lead to typing errors due to, for example, incorrect click actions, too small of a key size, compact key spacing and/or indeterminate key characters.

BRIEF DESCRIPTION OF THE DRAWINGS

The various advantages of embodiments will become apparent to one skilled in the art by reading the following specification and appended claims, and by referencing the following drawings, in which:

DETAILED DESCRIPTION

Figure 1:
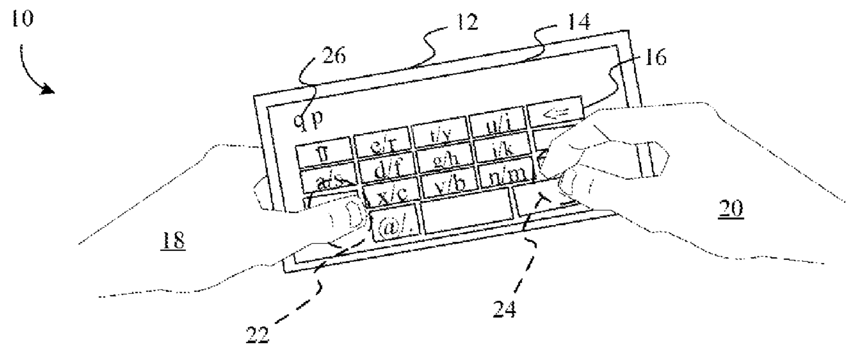
FIG. 1 is a block diagram of an example approach to provide a category-based keyboard configuration and/or to select of an element thereof according to an embodiment.

FIG. 1 shows an approach 10 to provide a category-based keyboard configuration and/or to select an element thereof according to an embodiment. In the illustrated example, a user may hold and/or contact an apparatus 12. The apparatus 12 may include any computing device and/or data platform such as a laptop, personal digital assistant (PDA), wireless smart phone, media content player, imaging device, mobile Internet device (MID), any smart device such as a smart phone, smart tablet, smart TV, computer server, and so on, or any combination thereof. In one example, the apparatus 12 may include a relatively high-performance mobile platform such as a notebook having a relatively high processing capability (e.g., Ultrabook® convertible notebook, a registered trademark of Intel Corporation in the U.S. and/or other countries).

The apparatus 12 may also include an image capture device (not shown). For example, the image capture device may include an integrated camera of a computing device, a front-facing camera, a rear-facing camera, a rotating camera, a 2D (two-dimensional) camera, a 3D (three-dimensional) camera, a standalone camera, and so on, or combinations thereof. The illustrated apparatus 12 includes a display 14, such as a touch screen (e.g., a capacitive touch screen, a resistive touch screen, etc.). In one example, the display 14 may be capable of receiving a contact action from the user, and/or may be capable of electronically processing the contact action to achieve a goal associated with the contact action (e.g., enter a character to create a text message, etc.). The display 14 may also be capable of rendering information, such as one or more characters, keys, and/or keyboard configurations, described below. In the illustrated example, the user holds and/or contacts the apparatus 12 via a left hand 18 and/or a right hand 20.

The apparatus 12 may include a key module to provide one or more keys (e.g., software keys/softkeys), which may be rendered to the user via a display such the display 14. The key may include any type of key to provide functionality, such as a character key to enter a character, a modifier key to alter the function of other keys, a navigation key to move a cursor on a screen, a function and/or system command key to provide special actions (e.g., escape, break, shift, etc.), and so on, or combinations thereof. Thus, the key may include (e.g., be associated with) one or more characters to be entered, to identify the functionality for the key, and so on, or combinations thereof. The characters may include a letter (e.g., "a"), a number (e.g., "1"), a punctuation (e.g., "!"), a symbol, and so on, or combinations thereof. In one example, the symbol may include a currency symbol (e.g. "$"), a fraction symbol (e.g. "½"), a math symbol (e.g., "<", "+", "%", "∫", etc.), a trade symbol (e.g., "®"), a keyboard symbol (e.g., "⇧", "esc", "tab", "caps lock", "shift", "fn", "control", "alt", "return", etc.), a shape symbol (e.g., "◊", etc.), an arrow symbol (e.g., "➔", etc.), a check mark symbol (e.g., "□", etc.), a music symbol (e.g., "♪"), a Greek symbol (e.g. "ϕ"), an accent symbol (e.g., "~"), a special symbol (e.g., "¶", "@", "#". "☺", etc.), and so on, or combinations thereof.

Accordingly, the key module may provide at least one key including a single character (e.g., a key including the symbol "Return", etc.), two characters (e.g., a key including two letters "q" and "w", two letters "o" and "p", etc.), at least two characters (e.g., a key including three numbers "1", "2", and "3", etc.), and so on, or combinations thereof. In addition, the key module may provide at least one key including one or more sets of characters, such as a single "123/#&@" key including a first set of numbers "1", "2", and "3" and a second set of symbols "#", "&", and "@". Moreover, the key module may provide at least one key without characters, such as one or more space bar keys.

The key module may also provide a keyboard, which may include a configuration of one or more elements (e.g., characters, keys, functionalities for the keys, etc.). In the illustrated example, a keyboard configuration 16 includes a plurality of characters "q" and "w" in a "q/w" key, a plurality of keys, and/or a plurality of functionalities. In addition, the keyboard configuration 16 provides a reduction in the number of keys relative to a pre-existing keyboard configuration, an enlargement of the size of the keys and/or characters relative to a pre-existing keyboard configuration, an enlargement of the spacing between keys and/or characters relative to a pre-existing configuration, and so on, or combinations thereof. Thus, the keyboard configuration 16 may facilitate any desired size, spacing, functionality, and so on, or combinations thereof.

The apparatus 12 may include a contact module to recognize one or more touch areas. In one example, the touch area may be formed between one or more user digits (e.g., a finger of the user, part thereof, etc.) and the elements of the keyboard configuration 16. For example, the contact module may determine one or more qualities of at least one of the touch areas. The quality may include a dimension of the touch area, such as a size, a shape, and so on, or combinations thereof. The size of the touch area may include, for example, the width of the touch area, the length of the touch area, the height of the touch area, the diameter of the touch area, the radius of the touch area, the angles between parts of the touch area, and so on, or combinations thereof.

The shape of the touch area may include, for example, a square shape, a rectangular shape, a circular shape, an oval shape, a triangular shape, an amorphous shape, a continuous shape (e.g., a shape including no gaps), a discontinuous shape (e.g., a shape including one or more gaps), and so on, or combinations thereof. The contact module may also determine any other qualities, such as a pressure of the touch area, a temperature of the touch area, a feature of the touch area (e.g., print ridges, print bifurcations, etc.), and so on, or combinations thereof. In the illustrated example, the touch module recognizes a touch area 22 formed between a thumb of the left hand 18 and the "q/w" key of the keyboard configuration 16. In addition, the touch module recognizes a touch area 24 formed between a thumb of the right hand 20 and/or an index finger of the right hand 20 and an "o/p" key of the keyboard configuration 16.

The apparatus 12 may include a classification module to determine one or more categories. In one example, the category may be associated with at least one of the touch areas 22, 24. The classification module may determine that the categories associated with at least one of the touch areas 22, 24 include a hand category, a finger category, and so on, or combinations thereof. For example, the classification module may determine that the category associated with at least one of the touch areas 22, 24 includes a right hand class, a left hand class, a thumb class, an index finger class, a middle finger class, a ring finger class, and a little finger class, and so on, or combinations thereof.

Accordingly, the classification module may determine that the category includes an individual class, a collection of individual classes, and/or a combination of individual classes. In one example, the classification module may determine that only the left hand class or the thumb class are individually associated with the touch area 22, that the left hand class and the thumb class are collectively associated with the touch area 22, and/or that a combined left hand thumb class is associated with the touch area 22. In another example, the classification module may determine that only the right hand class, the thumb class, or the index finger class are individually associated with the touch area 24, that the right hand class, the thumb class and the index finger class are collectively associated with the touch area 24, and/or that that a combined right hand thumb class and/or a combined right hand index finger class are associated (individually, collectively, etc.) with the touch area 24.

The classification module may determine that the category includes any combination of classes, such as a multiple finger class (e.g., a class including two or more finger classes, etc.), a multiple hand class (e.g., a class including the right hand class and the left hand class), a multiple left hand finger class (e.g., a class including two or more left hand finger classes), a multiple right hand finger class (e.g., a class including two or more right hand finger class), a multiple hand-single finger class (e.g., a class including the right hand class, the left hand class, and the thumb class), a multiple hand-single left hand thumb class (e.g., a class including the right hand class and a left hand thumb class), and so on, or combinations thereof. In the illustrated example, the classification module determines that the left hand class, the left hand thumb class, etc., is associated with the touch area 22 using the qualities thereof. In addition, the classification module may determine that the right hand class, the right hand thumb class, the right hand index finger class, the multiple right hand finger class, etc. is associated with the touch area 24 using qualities thereof.

The apparatus 12 may also include a selection module to select at least one element of the keyboard configuration. For example, the selection module may use at least one of the touch areas 22, 24 to determine a character contacted, a key contacted, a functionality contacted, and so on, or combinations thereof. In one example, the selection module utilizes the touch area 22 (e.g., a position thereof, qualities thereof etc.) to determine that the character "q" and/or "w" is contacted, to determine that the key "q/w" is contacted, to determine the functionality (e.g., enter characters) is contacted, and so on, or combinations thereof. In another example, the selection module utilizes the touch area 24 to determine that the character "o" and/or "p" is contacted, to determine that the "o/p" key is contacted, to determine that the functionality (e.g., enter characters) is contacted, and so on, or combinations thereof.

The selection module may select a character (e.g., the letter "q", the letter "p", etc.) based on one or more categories, such as the left hand class, the thumb class, the left hand thumb class, the right hand class, the right hand thumb class, and so on, or combinations thereof. In one example, the selection module selects the character "q" based on the left hand class, the left hand thumb class, etc., when the touch area 22 is formed between the thumb of the left hand 18 and one or more keys of the keyboard configuration 16 including the character "q" (e.g., a "q" key, a "q/esc" key, the "q/w" key, etc.). In another example, the selection module may select the character "p" based on the right hand class, the right hand thumb class, the right hand index finger class, the multiple right hand finger class, etc., when the touch area 24 is formed between the thumb of the right hand 20 and/or the index finger of the right hand 20 and one or more keys of the keyboard configuration 16 including the character "p" (e.g., a "p" key, an "esc/p" key, the "o/p", etc.). The selection module may also select another character of the plurality of the characters in the same key based on another category. For example, the selection module may select the character "o" in the "o/p" key based on the left hand class, the left hand thumb class, etc., may select the character "w" in the "q/w" key based on the right hand class, the right hand thumb class, etc., and so on, or combinations thereof.

Additionally, the selection module may select at least one of the characters based on a single contact action for the key. In one example, the selection module may select the character "q" in the "q/w" key based on a singe contact action (e.g., single tap, single swipe, single press, etc.) for the "q/w" key by the thumb of the left hand 18. In another example, the selection module may select the character "p" in the "o/p" key based on a single contact action for the "o/p" key by the thumb of the right hand 20 and/or the index finger of the right hand 20. In a further example, the selection module may select another character of the plurality of the characters in the same key based on another single contact action. For example, the selection module may select the character "o" in the "o/p" key based on another single tap by the same hand, the same finger, the same type of finger, a different type finger, a different hand, and so on, or combinations thereof.

The selection module may utilize one or more selection rules to select the character, the key, and/or the functionality for the key. In one example, the selection rule may be associated with at least one of the categories, the keys, and/or the functionality for the keys, the keyboard configurations. For example, the selection rule may indicate that for any key including two or more characters (e.g. the "q/w" key, etc.) and/or two or more sets of characters (e.g., the "123/#&@" key), that the selection module choose one or more characters and/or sets of characters on a side of a spacer (e.g., the left side of a spacer "/") based on a hand category such as the left hand class, the right hand class, etc., based on a finger category such as the thumb class, the index finger class, etc., based on a combined category such as the left hand thumb class, the right hand thumb class, etc., and so on, or combinations thereof.

The spacer may include any representation to separate characters and/or sets of characters. For example the spacer may include a divider (e.g., "/"), an empty space, a different row in which the characters and/or the sets of characters are disposed, a different column in which the characters and/or the sets of characters are disposed, and so on, or combinations thereof. Thus, in one example, the selection rule may indicate that for the "q/w" key of the keyboard configuration 16, the selection module is to choose the character "q" on the left side of the spacer "/" based on a left hand category and/or a left hand thumb category, while indicate that the selection module is to choose the character "w" on the right side of the spacer "/" based on a right hand category and/or a right hand thumb category.

The selection module may select the character, the key, and/or the functionality for the key independently of the category, independently of determining the category, and so on, or combinations thereof. For example, the selection rule may indicate that for any key without a character (e.g., a space bar key) and/or a single character (e.g., the "q" key), the selection module may choose the character (e.g. "q") based on the formation of a touch area, the presence of any quality of a touch area, any category (e.g., any hand category, any finger category, etc.), and so on, or combinations thereof. The absence of a selection rule may also cause the selection module to choose the character, the key, and/or the functionality for the key independently of the category, independently of determining the category, and so on, or combinations thereof.

The selection module may select the characters based on a preference, such as a pre-defined (e.g., configurable, programmable) preference. In one example, the character, the key, and/or the functionality for the key may be selected based on a pre-defined preference for one or more categories, for the absence of a category, for one or more touch areas, for one or more selection rules, for the absence of a selection rule, and so on, or combinations thereof. In another example, the selection module may select the characters based on a pre-defined selection rule. For example, the selection rule may be pre-defined to indicate the circumstances to select the character, to select the key, and/or to select the functionality for the key.

The selection module may select the characters based on a pre-defined category. In one example, the category may be pre-defined by utilizing reference data, such as a standard reference touch area, a specific reference touch area for the user, and so on, or combinations thereof. For example, a reference touch area may be captured and/or stored (e.g., via a registration operation) in which information representative of the type of user (e.g., qualities of a touch area for an adult, etc.) and/or representative of the specific user (e.g., qualities of a touch area for the specific user) may be held in a reference database to be mapped to one or more categories. The category may, however, also be mapped to any character, key, functionality for the key and so on, or combinations thereof.

Accordingly, when a newly formed touch area and/or current touch area is encountered, the character, the key, and/or the functionality for the key may be selected based on the category that is mapped to, for example, the reference data including a certain identity to the newly formed touch area (e.g., 99% total identity, 95% total identity, 100% feature identity, 50% total identity and 50% feature identity, etc.). Moreover, the category may be pre-defined to specify the type of category to be mapped to the reference data, to the character, to the key, and so on, or combinations thereof. For example, the category may be pre-defined to specify that the character, the key, etc., include the left hand class and exclude the left hand finger class, vice versa, and so on, or combinations thereof.

The characters selected may be used to accomplish a goal associated with the touch areas 22, 24. In one example, the selected character may be used to create work product. For example, the work product may include a message such as a text message, an instant message, a chat, a post, a blog, a query message (e.g., a search query), an email message, a phone message (e.g. a phone number, etc.) and so on, or combinations thereof. The work product may include, in another example, a web page, a document, a presentation, a spreadsheet, a drawing, and so on, or combinations thereof. In addition, the selected character may be used to provide access to a secure content. For example, the selected characters may be used to log into a secure environment (e.g. to enter a password), may be used to authenticate the user, may be used to unlock the content, and so on, or combinations thereof. In the illustrated example, the selected characters "q" and "p" are displayed in a render portion 26 of the display 14 to accomplish the goal of the touch areas 22, 24. The selected characters, however, may be chosen and not displayed, and/or may be transformed to another representation prior to the display, for example to minimize inadvertent publication of characters.

Figure 2:
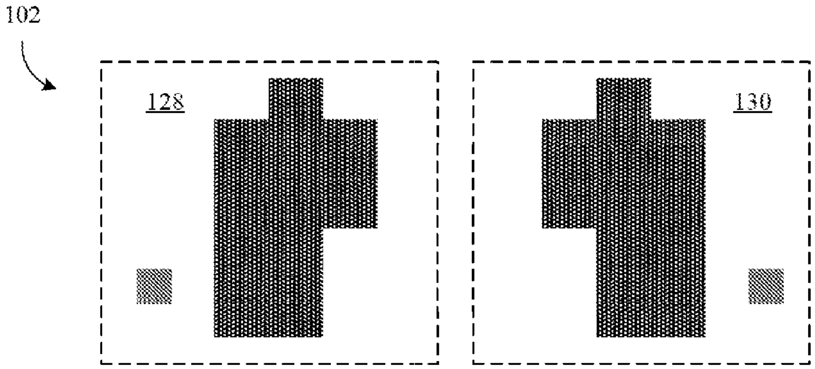
FIG. 2 is a block diagram of an example approach to determine a category according to an embodiment.

Turning now to FIG. 2, an example approach 102 is shown to determine one or more categories according to an embodiment. In one example, the category may be associated with a touch area 128 and/or a touch area 130. The touch areas 128, 130 may be formed between one or more user digits and one or more elements of a keyboard configuration, such as a character, a key, configuration functionality of the key, and so on, or combinations thereof. The touch areas 128, 130 may be filtered at any time, such as during formation, after formation, before rendering, after rendering, and so on, or combinations thereof. The touch areas 128, 130 may be filtered to minimize noise, to enhance a determination of qualities thereof, and so on, or combinations thereof. The qualities of the touch areas 128, 130 may include, for include a size, a shape, a pressure, a temperature, a feature, and so on, or combinations thereof. In the illustrated example, the touch areas 128, 130 include mirrored dimensions of each other, such as a mirrored size and/or shape. Thus, the touch areas 128, 130 may represent opposite classes. For example, the touch area 128 may represent a left hand class, a left hand thumb class, etc., while the touch area 130 may represent a right hand class, a right hand thumb class, etc.

The touch areas 128, 130 may be used to determine a character to be contacted, a key to be contacted/selected, a functionality of the key to be contacted/selected, and so on, or combinations thereof. For example, the location of the touch areas 128, 130 relative to the character, the key, and/or the keyboard configuration may be utilized to select the character, the key, the functionality for the key, and so on, or combinations thereof. In another example, one or more of the qualities of the touch areas 128, 130 may be utilized to select the character, the key, the functionality for the key, and so on, or combinations thereof. For example, the pressure (e.g., maximum pressure, minimum pressure, etc.), the dimensions (e.g., maximum size, maximum shape, minimum size, etc.), etc., of the touch areas 128, 130 may be used to determine a region of interest to select the character, the key, the functionality for the key, and so on, or combinations thereof.

Additionally, the touch areas 128, 130 may represent a newly encountered touch area and/or a current touch area, such as a touch area formed by a current touch action. The touch areas 128, 130 may also represent reference data, such as a standard reference touch area, a specific reference touch area for the user, and so on, or combinations thereof. In one example, the touch areas 128, 130 (e.g., qualities thereof) may represent a standard adult left hand thumb class and a standard adult right hand thumb class, respectively. The touch areas 128, 130 may, however, represent any standard user characteristic, such as standard gender, age, weight, height, and so on, or combinations thereof. In addition, the touch areas 128, 130 may represent the specific reference touch area for the user. Thus, the touch areas 128, 130 may be captured, stored, mapped to one or more categories, used for comparison to newly encountered touch areas, used for comparison to reference data, and so on or combinations thereof.

Figure 3A:
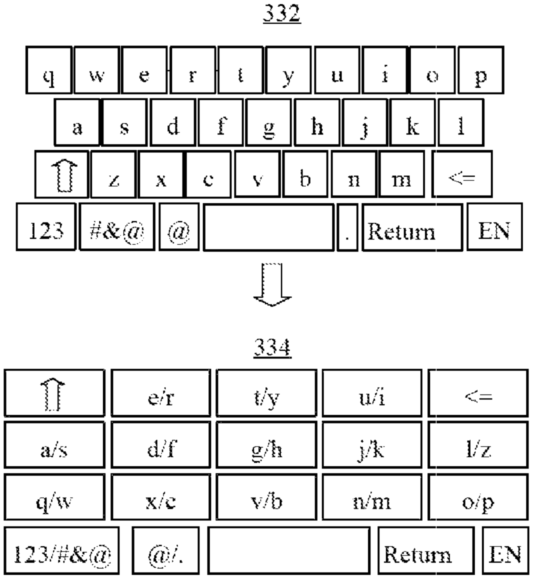
FIGS. 3A and 3B are block diagrams of examples of a category-based keyboard configuration and/or an element selected thereof according to an embodiment.
Figure 3B:
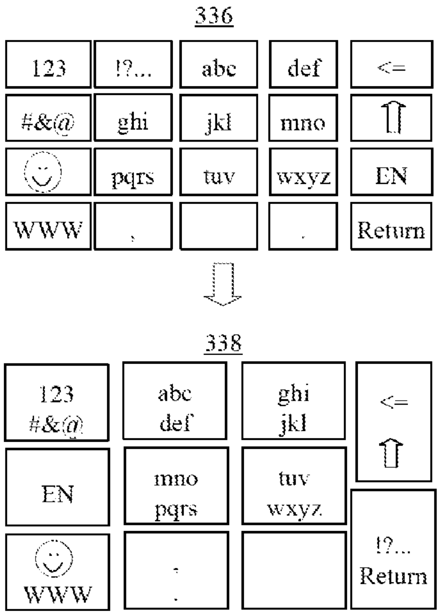

FIGS. 3A and 3B show examples of a category-based keyboard configuration and/or an element selected thereof according to an embodiment. In the illustrated example, a pre-existing keyboard configuration 332 and/or a pre-existing keyboard configuration 336 may include a certain number of characters thereof, keys thereof, dimensions thereof, spacing thereof, functionality thereof, and so on, or combinations thereof. For example, the pre-existing keyboard configuration 332 may include thirty-five keys having respective size, shape, spacing, and having a single character in all but three keys (e.g., a "123" key, a "#&@" key, and/or a space bar). The pre-existing keyboard configuration 336 may include twenty keys having respective size, shape, spacing, and having a single character in eight keys, a space bar key without any characters, and/or three or more characters in a remainder of the keys thereof.

In the illustrated example, a keyboard configuration 334 and/or a keyboard configuration 338 includes a plurality of characters in at least one key. For example, the keyboard configuration 334 includes fifteen out of twenty keys having two or more characters. In addition, the keyboard configuration 338 includes eleven out of twelve keys having two or more characters. Moreover, the keyboard configurations 334, 338 may be capable of providing multiple contexts for one or more keys (e.g., based on a hand and/or finger to be used) to facilitate any desired functionality, size, spacing, and so on, or combinations thereof. For example, the keyboard configurations 334, 338 may provide a reduction in the number of keys, an enlargement of the size of the characters and/or keys, an enlargement in the spacing between the characters and/or keys, a flexible keyboard configuration, and so on, or combinations thereof.

In one example, the keyboard configuration 334 provides a reduction in the number of keys relative to the pre-existing keyboard configuration 332 from thirty-five keys to twenty keys. In addition, the keyboard configuration 334 provides an increase in the size of the keys and/or an increase in the spacing of the keys relative to the pre-existing keyboard configuration 332. Moreover, the keyboard configuration 334 provides an increase in the size of the characters and/or an increase in the spacing of the characters relative to the pre-existing keyboard configuration 332. In another example, the keyboard configuration 338 provides a reduction in the number of keys relative to the pre-existing keyboard configuration 336 from twenty keys to eleven keys. In addition, the keyboard configuration 338 provides an increase in the size of the keys and/or an increase in the spacing of the keys relative to the pre-existing keyboard configuration 336. Moreover, the keyboard configuration 338 provides an increase in the size of the characters and/or an increase in the spacing of the characters relative to the pre-existing keyboard configuration 336. Thus, user error as a result of an incorrect click action, too small of a key size, compact key spacing, indeterminate key characters, etc., may be minimized and/or eliminated.

The keyboard configurations 334, 338 may be based on one or more categories. The category may include a hand category, a finger category, and so on, or combinations thereof. For example, the category may include a right hand class, a left hand class, a thumb class, an index finger class, a middle finger class, a ring finger class, and a little finger class, and so on, or combinations thereof. Accordingly, the category may include one individual class, a collection of individual classes, and/or a combination of individual classes. For example, a combination of classes may include a multiple finger class, a multiple hand class, a multiple left hand finger class, a multiple right hand finger class, a multiple hand-single finger class, a multiple hand-single left hand thumb class, and so on, or combinations thereof.

Accordingly, the capability to provide multiple contexts via one or more categories for an element of the keyboard configuration 334, 338 may dictate the architecture (e.g., the appearance, etc.) of the keyboard configurations 334, 338. For example, the character "q" may be selected based on a left hand category, a left hand thumb category, etc., when a touch area is formed between a thumb of a left hand and a "q/w" key of the keyboard configuration 334. In another example, the character "w" may be selected based on a right hand category, a right hand thumb category, etc., when a touch area is formed between a thumb of a right hand and the "q/w" key. Thus, the architecture of the keyboard configurations 334, 338 may include the "q/w" key based on the categories. In addition, the architecture of the keyboard configurations 334, 338 may include a change in element size (e.g., size of character, size of key, etc.), spacing, etc., for example when two or more characters are provided in one or more keys based on the categories. The architecture of the keyboard configurations 334, 338 may, however, be guided by any mapping to categories, to selection rules, and so on, or combinations thereof.

In addition, at least one character from the plurality of characters in the "q/w" key of the keyboard configuration 334 may be selected based on a single contact action for the "q/w" key. For example, the character "q" may be selected based on a single contact action (e.g., single tap, single swipe, single press, etc.) for the "q/w" key. Accordingly, a click action involving more than one click to select a character may be minimized. A character, however, may also be selected based on a plurality of contact actions. For example, a set of characters "wxyz" in a "tuvwxyz" key of the keyboard configuration 338 may be selected based on a right hand category, a right hand thumb category, etc., when a touch area is formed via a first contact action between a thumb of a right hand and the "tuvwxyz" key. In addition, a second contact action may be encountered to cause the character “w” to be chosen from the selected set of characters “wxyz” based on a second contact action, such as a second tap, whether or not the first contact action and the second contact action are associated with the same category, different categories, and so on, or combinations thereof.

Figure 4:
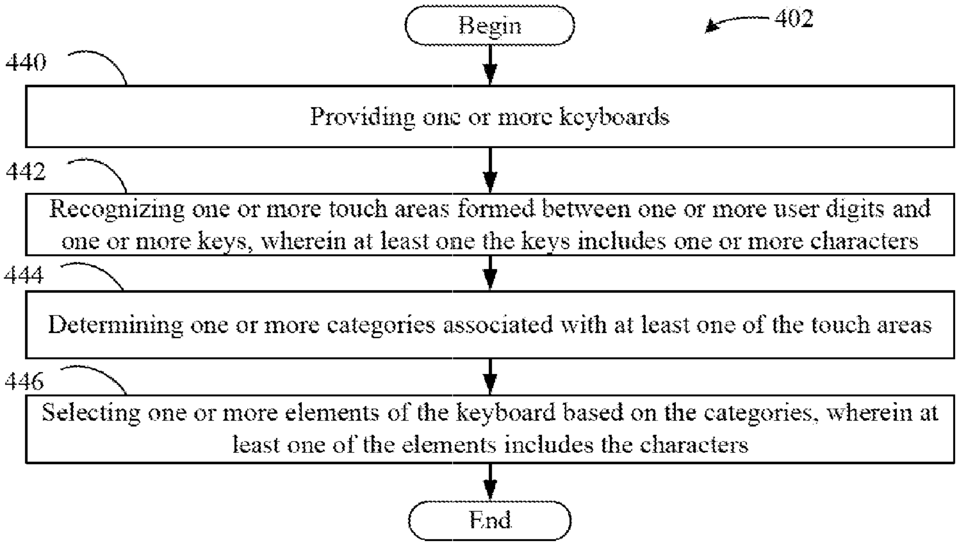
FIG. 4 is a flowchart of an example of a method to provide a category-based keyboard configuration and/or to select an element thereof according to an embodiment.

Turning now to FIG. 4, a method 402 is shown to provide a category-based keyboard configuration and/or to select an element thereof according to an embodiment. The method 402 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), CMOS or transistor-transistor logic (TTL) technology, or any combination thereof. For example, computer program code to carry out operations shown in the method 402 may be written in any combination of one or more programming languages, including an object oriented programming language such as C++ or the like and conventional procedural programming languages, such as the “C” programming language or similar programming languages. Moreover, the method 402 may be implemented using any of the herein mentioned circuit technologies.

Illustrated processing block 440 involves providing one or more keyboards. The keyboard may include a configuration of one or more elements, such as a key including a character to be entered, to identify the functionality of the key, and so on, or combinations thereof. In one example, the character may include a letter, a number, a punctuation, a symbol, and so on, or combinations thereof. In addition, at least one key may include no characters, a single character, two characters, more than two characters, one or more sets of characters, and so on, or combinations thereof. Moreover, the keyboard configuration may provide a reduction in the number of keys relative to a pre-existing keyboard configuration, an enlargement of the size of the keys relative to a pre-existing keyboard configuration, and so on, or combinations thereof. The architecture of the keyboard configuration may be based on a category, a selection rule, and so on, or combinations thereof.

Illustrated processing block 442 involves recognizing one or more touch areas formed between one or more user digits and one or more keys. In one example, recognizing the touch area may involve determining a position of the touch area, such as the position of the touch area relative to the character, the key, and/or the keyboard configuration. In another example, recognizing the touch area may involve determining one or more qualities of the touch area, such as a dimension of the touch area, a pressure of the touch area, a temperature of the touch area, a feature of the touch area, and so on, or combinations thereof. In a further example, recognizing the touch area may involve filtering the touch area.

Illustrated processing block 444 involves determining one or more categories associated with at least one of the touch areas. The category may be determined based on reference data, for example utilizing a standard reference touch area, a specific reference touch area for the user, and so on, or combinations thereof. The category may include a hand category, a finger category, and so on, or combinations thereof. For example, the category may include a right hand class, a left hand class, a thumb class, an index finger class, a middle finger class, a ring finger class, and a little finger class, and so on, or combinations thereof. Accordingly, the category may include one individual class, a collection of individual classes, and/or a combination of individual classes. For example, a combination of classes may include a multiple finger class, a multiple hand class, a multiple left hand finger class, a multiple right hand finger class, a multiple hand-single finger class, a multiple hand-single left hand thumb class, and so on, or combinations thereof.

Illustrated processing block 446 involves selecting at least one element of the keyboard (e.g., select an element of the configuration), such as a character, a key, and/or functionality for the key, etc., based on one or more of the categories. For example, selecting at least one element (e.g., a character) may involve using the touch area to determine which character is contacted, which key is contacted, and/or which functionality for the keyboard has been requested. In one example, the location of the touch area relative to the character, the key, and/or the keyboard configuration may be utilized to select the character, the key, and/or the functionality for the key. In another example, selecting at least one character may involve using a quality of the touch area to select the character, the key, and/or the functionality for the key. For example, the pressure (e.g. maximum pressure, minimum pressure, etc.), the dimensions (e.g., maximum size, maximum shape, minimum size, etc.), etc., of the touch area may be used to determine a region of interest to select the character, the key, and/or the functionality for the key.

Additionally, selecting at least one element (e.g., a character) may involve using one or more of the categories to choose the character, the key, and/or the functionality for the key. In one example, the character may be selected based on the hand category and/or the finger category. For example, the character may be selected based on the left hand class, the right hand class, the thumb class, and so on, or combinations thereof. In addition, selecting at least one element (e.g., the character) may involve using one or more selection rules. For example, the selection rule may be associated with one or more of the categories to indicate that the selection of the element (e.g., the character) be based on the category. The selection rule may, in another example, indicate that the character, the key, and/or the functionality for the key be selected independently of the category, independently of determining the category, and so on, or combinations thereof. For example, the element (e.g. the character) may be chosen based on the formation of a touch area, any quality of a touch area, any category, and so on, or combinations thereof. The absence of a selection rule may also indicate that selection may be accomplished independently of the category, independently of determining the category, and so on, or combinations thereof.

Additionally, selecting at least one element (e.g., the character) may involve a selection based on a single contact action for the key. For example, one character of a plurality of characters may be selected based on a single contact action (e.g., single tap, single swipe, single press, etc.) for the key. In addition, selecting the element (e.g., the character) may include a selection based on a plurality of contact actions for the key. For example, one set of characters from a plurality of sets of characters may be selected based on a first contact action, such as a first tap, and a character from the selected set of characters may be chosen based on a second contact action, such as a second tap, whether or not the first contact action and the second contact action are associated with the same category, different categories, and so on, or combinations thereof.

Additionally, selecting at least one element (e.g., the character) may involve selection based on a pre-defined preference, a pre-defined selection rule, a pre-defined category, and so on, or combinations thereof. In one example, a pre-defined preference may allow the character, the key, and/or the functionality of for the key to be selected based on a pre-defined preference for one or more categories, for the absence of a category, for one or more touch areas, for one or more selection rules, for the absence of a selection rule, and so on, or combinations thereof. In another example, a selection rule may be pre-defined to indicate the circumstances to select the character, to select the key, to select the functionality for the key, and so on, or combinations thereof.

In addition, the category may be pre-defined utilizing reference data, such as standard reference touch areas, a specific reference touch areas for the user, and so on, or combinations thereof. For example, a reference touch area may be captured and/or stored in which information representative of the type of user and/or representative of the specific user may be held in a reference database to be mapped to one or more categories. Moreover, the category may be mapped to any character, key, functionality for the key, and so on, or combinations thereof. In addition, the category may be pre-defined to specify the type of category to be mapped to the reference data, to the character, to the key, the functionality for the key, and so on, or combinations thereof.

Additionally, selecting the character may involve accomplishing a goal associated with the touch area. In one example, the selected element (e.g., the selected character) may be used to create work product. For example, the work product may include a message, a web page, a document, a presentation, a spreadsheet, a drawing, and so on, or combinations thereof. In another example, the selected element (e.g., the selected character) may be used to provide access to a secure content. For example, the selected character may be used to log into a secure environment, to authenticate the user, to unlock the content, and so on, or combinations thereof. The selected element (e.g., the selected character) may be displayed, may be chosen and not displayed, may be transformed to another representation prior to the display, and so on, or combinations thereof.

Figure 5:
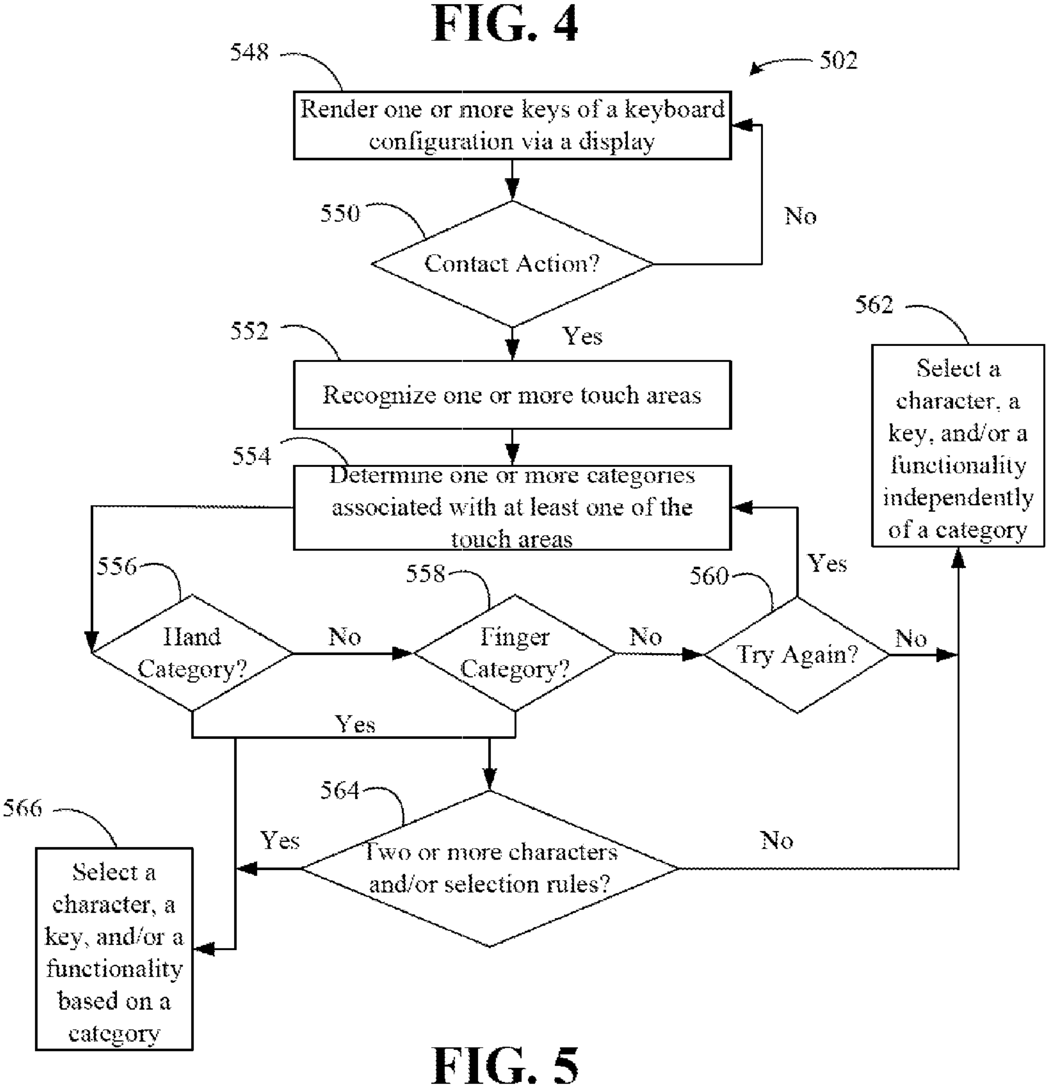
FIG. 5 is a flowchart of an example of a method to provide a category-based keyboard configuration and/or to select of an element thereof according to an embodiment.

FIG. 5 shows a method 502 to provide a category-based keyboard configuration and/or to select an element thereof according to an embodiment. The method 502 could be implemented using any of the herein mentioned technologies. Illustrated processing block 548 may render one or more keys in a keyboard configuration via a display. In one example, at least one of the keys may include one or more characters. The keyboard configuration may provide a reduction in the number of keys relative to a pre-existing keyboard configuration, an enlargement of the size of the keys relative to a pre-existing keyboard configuration, and so on, or combinations thereof. The architecture (e.g. appearance and/or properties) of the keyboard configuration may be based on at least one category.

A determination may be made at block 550 as to whether there is a contact action. For example, the determination may include recognizing if a user has contacted a display (e.g., a touch screen, etc.), has contacted a character of the keyboard configuration, has contacted a key of the keyboard configuration, and so on, or combinations thereof. If there is no contact action, then the keys may be rendered at the block 458, discussed above. If there is a contact action, one or more touch areas may be recognized at block 552. For example, one or more touch areas formed between one or more user digits and one or more of the keys may be recognized at the block 552.

A category associated with at least one of the touch areas may be determined at block 554. For example, a determination may be made if the category associated with at least one of the touch areas includes a hand category at block 556, a finger category at 558, and so on, or combinations thereof. If the category associated with at least one of the touch areas may not be determined, or if a threshold number of determinations is reached (e.g. a pre-determined threshold for the number of times to determine the category), the operation may be repeated via block 560. The character, the key, and/or the functionality for the key may be selected independently of any category, however, at block 562 via the block 560 if the category associated with at least one of the touch areas may not be determined and/or a maximum threshold number of determination is reached.

If the category associated with at least one of the touch areas may be determined, a determination may be made at block 564 as to whether the key includes two or more characters and/or if there are one or more selection rules. If the key includes no characters, includes a single character, and/or includes two or more characters but no selection rules, the character, the key, and/or the functionality for the key may be selected independently of any category at the block 562. Moreover, if the category associated with at least one of the touch areas may be determined and no further evaluation is employed, if it is determined that the key includes two or more characters in a further evaluation at the block 564, and/or if it is determined that there is a selection rule for a key including two or more characters in a further evaluation at the block 564, the character, the key, and/or the functionality for the key may be selected based on the category at block 566.

Figure 6:
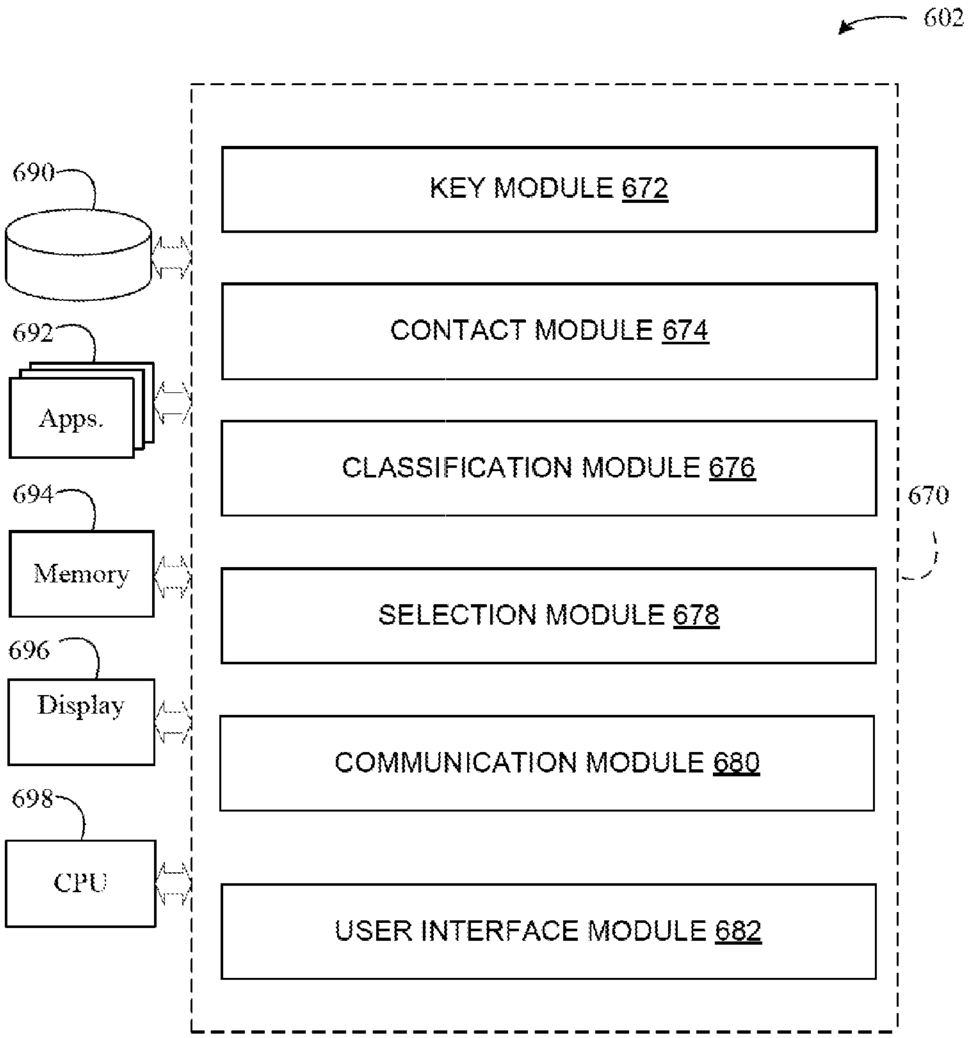
FIG. 6 is a block diagram of an example of a logic architecture according to an embodiment.

Turning now to FIG. 6, an apparatus 602 is shown including logic 670 to provide a category-based keyboard configuration and/or to select an element thereof according to an embodiment. The logic architecture 670 may be generally incorporated into a platform such as such as a laptop, personal digital assistant (PDA), wireless smart phone, media player, imaging device, mobile Internet device (MID), any smart device such as a smart phone, smart tablet, smart TV, computer server, and so on, or combinations thereof. The logic architecture 670 may be implemented in an application, operating system, media framework, hardware component, and so on, or combinations thereof. The logic architecture 670 may also be implemented in any component of a keyboard configuration and/or element selection pipeline, such as a network interface component, memory, processor, hard drive, operating system, application, and so on, or combinations thereof. For example, the logic architecture 670 may be implemented in a processor, such as a central processing unit (CPU), a graphical processing unit (GPU), a visual processing unit (VPU), a sensor, an operating system, an application, and so on, or combinations thereof. The apparatus 602 may include and/or interact with storage 690, applications 692, memory 694, display 696. CPU 698, and so on, or combinations thereof.

In the illustrated example, the logic architecture 670 includes a key module 672 to provide one or more keys. In one example, the key may be rendered in a display, such as a touch screen. The key may include any type of key to provide functionality, such as a character key to enter a character, a modifier key to alter the function of other keys, a navigation key to move a cursor on a screen, a function and/or system command key to provide special actions, and so on, or combinations thereof. The key may include one or more characters to be entered, to identify the functionality of the key, and so on, or combinations thereof. The characters may include a letter, a number, a punctuation, a symbol, and so on, or combinations thereof.

In addition, the key module may provide a keyboard configuration including one or more of the keys. The keyboard configuration may include a plurality of characters in at least one of the keys. The keyboard configuration may include at least one key having no characters, one or more characters, one or more sets of characters, and so on, or combinations thereof. The keyboard configuration may also provide a reduction in the number of keys relative to a pre-existing keyboard configuration, an enlargement of the size of the keys relative to a pre-existing keyboard configuration, and so on, or combinations thereof.

Additionally, the logic architecture 670 may include a contact module 674 to recognize one or more touch areas formed between one or more user digits and the keys. In one example, the contact module 674 may determine a position of the touch area, such as the position of the touch area relative to the character, the key, and/or the keyboard configuration. In another example, the contact module 674 may determine one or more qualities of the touch area, such as a dimension of the touch area, a pressure of the touch area, a temperature of the touch area, a feature of the touch area, and so on, or combinations thereof. In a further example, the contact module 674 may filter the touch area.

Additionally, the illustrated logic architecture 670 may include a classification module 676 to determine one or more categories associated with at least one of the touch areas. The category may include a hand category, a finger category, and so on, or combinations thereof. For example, the category may include a right hand class, a left hand class, a thumb class, an index finger class, a middle finger class, a ring finger class, and a little finger class, and so on, or combinations thereof. Accordingly, the category may include one individual class, a collection of individual classes, and/or a combination of individual classes. For example, a combination of classes may include a multiple finger class, a multiple hand class, a multiple left hand finger class, a multiple right hand finger class, a multiple hand-single finger class, a multiple hand-single left hand thumb class, and so on, or combinations thereof.

Additionally, the illustrated logic architecture 670 includes a selection module 678 to select at least one character, key, functionality of for the key and so on, or combinations thereof. In one example, the selection module 678 may select at least one element of the keyboard configuration (e.g., a character) based on a category, such as the hand category and/or the finger category. In another example, the selection module 678 may utilize one or more selection rules to select at least one character, key, and/or functionality for the key. For example, the selection rule may be associated with one or more of the categories to indicate that the selection of the character be based on the category. The selection rule may indicate, however, that the character, the key, and/or the functionality for the key be selected independently of the category, independently of determining the category, and so on, or combinations thereof. For example, the character may be chosen based on the formation of a touch area, any quality of a touch area, any category, and so on, or combinations thereof. The absence of a selection rule may also indicate selection be accomplished independently of the category, independently of determining the category, and so on, or combinations thereof.

In addition, the selection module 678 may select at least one character, key, and/or functionality for the key based on a single contact action for the key. In one example, one character of a plurality of characters in the key may be selected based on a single contact action (e.g., single tap, single swipe, single press, etc.) for the key. Moreover, the selection module 678 may select at least one character, key, and/or functionality for the key based on a plurality of contact actions for the key. For example, one set of characters of a plurality of sets of characters may be selected based on a first contact action, such as a first tap, and a character from the selected set of characters may be chosen based on a second contact action, such as a second tap, whether or not the first contact action and the second contact action are associated with the same category, different categories, and so on, or combinations thereof.

In addition, the selection module 678 may select at least one character, key, and/or functionality for the key based on based on a pre-defined preference, a pre-defined selection rule, pre-defined category, and so on, or combinations thereof. In one example, the selection module 678 may utilize a category that is pre-defined using reference data, such as a standard reference touch areas, a specific reference touch areas for the user, and so on, or combinations thereof. In another example, the category may be pre-defined to specify the type of category to be mapped to the reference data, to the character, to the key, and so on, or combinations thereof.

Additionally, the illustrated logic architecture 670 may include a communication module 680. The communication module may be in communication and/or integrated with a network interface to provide a wide variety of communication functionality, such as cellular telephone (e.g., W-CDMA (UMTS), CDMA2000 (IS-856/IS-2000), etc.), WiFi, Bluetooth (e.g., IEEE 802.15.1-2005, Wireless Personal Area Networks), WiMax (e.g., IEEE 802.16-2004), Global Positioning Systems (GPS), spread spectrum (e.g., 900 MHz), and other radio frequency (RF) telephony purposes. The communication module 680 may communicate any data associated with a keyboard, including data related to a character, a key, a keyboard configuration, a touch area, a category, a selection, and so on, or combinations thereof. For example, the communication module may communicate a quality of a touch area to a server and receive one or more categories and/or selection rules in response.

Additionally, any data associated with a keyboard may be stored in the storage 690, may be displayed in via the applications 692, may be stored in the memory 694, may be displayed via the display 696, and/or may be implemented via the CPU 698. In addition, the illustrated logic architecture 670 may include a user interface module 682. The user interface module 682 may provide any desired interface, such as a graphical user interface, a command line interface, and so on, or combinations thereof. The user interface module 682 may provide access to one or more settings associated with a keyboard (e.g., keyboard configuration, character selection, etc.). The settings may include options to define, for example, characters (e.g., specific characters, sets of characters, types of characters, dimensions thereof, etc.), keys (e.g., specific keys, sets of keys, types of keys, dimensions thereof, etc.), functionalities (e.g., space, escape, break, etc.), keyboard configurations (e.g., architecture, sets of keyboard configurations, types of keyboard configurations, etc.), parameters to recognize and/or process touch areas (e.g., filtering, minimum/maximum pressure, etc.), one or more categories (e.g., reference data, mappings, types of categories, etc.), and/or parameters to select categories, keys, functionality, and/or keyboard configurations (e.g., categories used to make a selection, selection rules, preferences, etc.). The settings may include automatic settings (e.g., automatically select a character), manual settings (e.g., request the user to manually confirm character selection), and so on, or combinations thereof.

While examples have shown separate modules for illustration purposes, it is should be understood that one or more of the modules of the logic architecture 670 may be implemented in one or more combined modules, such as a single module including one or more of the key module 672, the contact module 674, the classification module 676, the selection module 678, the communication module 680, and/or the user interface module 682. In addition, it should be understood that one or more logic components of the apparatus 602 may be on platform, off platform, and/or reside in the same or different real and/or virtual space as the apparatus 602. For example, the classification module 676 and/or the selection module 678 may reside in a computing cloud environment on a server while one or more of the other modules of the logic architecture 670 may reside on a computing platform where the user is physically located, and vice versa, or combinations thereof.

Figure 7:
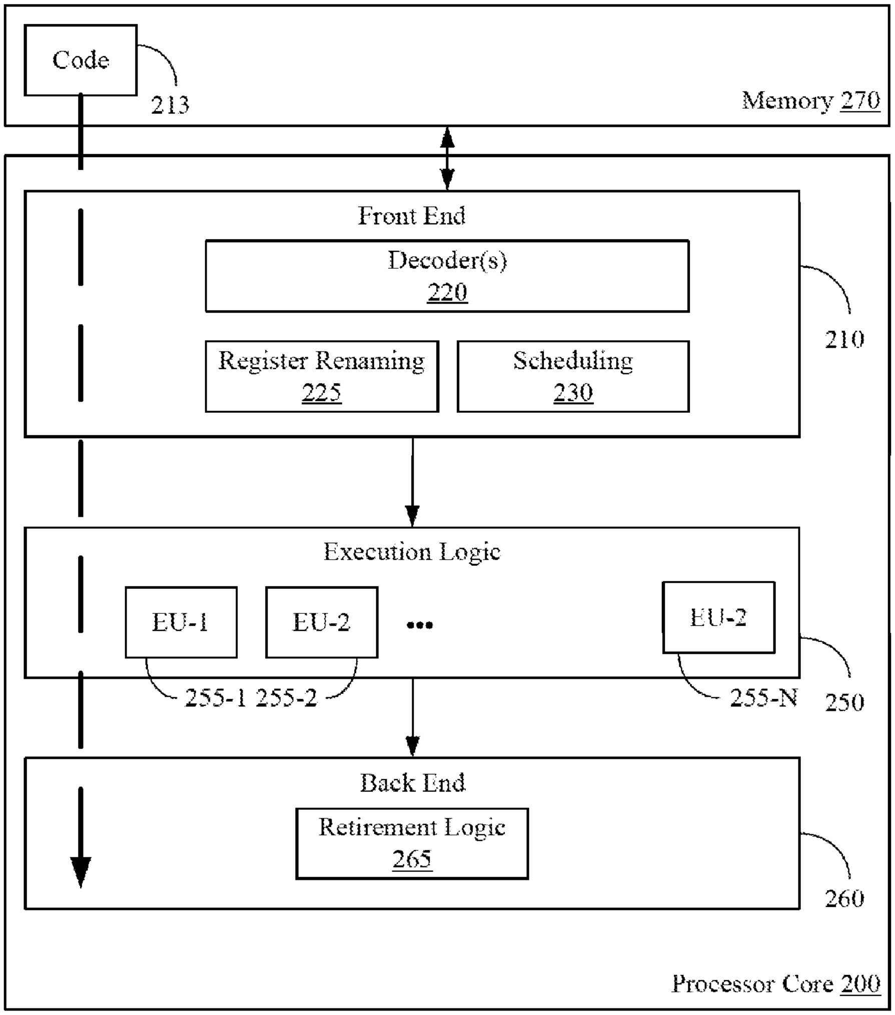
FIG. 7 is a block diagram of an example of a processor according to an embodiment.

Turning now to FIG. 7, a processor core 200 according to one embodiment is shown. The processor core 200 may be the core for any type of processor, such as a micro-processor, an embedded processor, a digital signal processor (DSP), a network processor, or other device to execute code to implement the technologies described herein. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 670 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that may perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
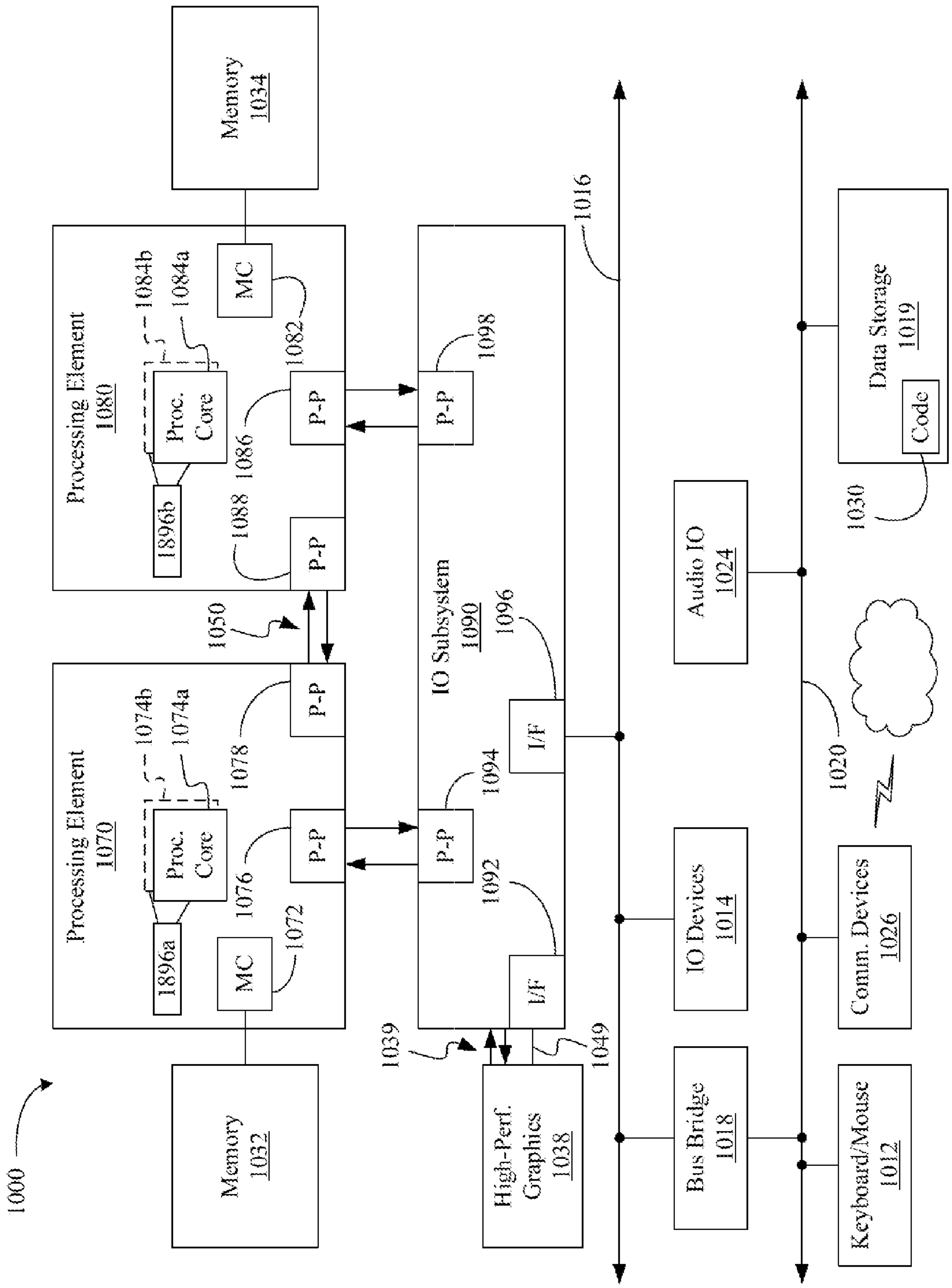
FIG. 8 is a block diagram of an example of a system according to an embodiment.

FIG. 8 shows a block diagram of a system 1000 in accordance with an embodiment. Shown in FIG. 8 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores **1074*a* and 1074*b* and processor cores 1084*a* and 1084*b*). Such cores 1074, 1074*b*, 1084*a*, 1084*b* may be configured to execute instruction code in a manner similar to that discussed above in connection with FIG. 7**.

Each processing element 1070, 1080 may include at least one shared cache 1896. The shared cache **1896*a*, 1896*b* may store data (e.g., instructions) that are utilized by one or more components of the processor, such as the cores 1074*a*, 1074*b* and 1084*a*, 1084*b*, respectively. For example, the shared cache may locally cache data stored in a memory 1032, 1034** for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There may be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 8, the I/O subsystem 1090 includes P-P interfaces 1094 and 1098. Furthermore. I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope is not so limited.

As shown in FIG. 8, various I/O devices 1014 such as the display 14 (FIG. 1) and/or the display 696 (FIG. 6) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the logic architecture 670 (FIG. 6), already discussed. Further, an audio I/O 1024 may be coupled to second bus 1020.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

Additional Notes and Examples:

Examples may include subject matter such as an apparatus to provide a category-based keyboard and/or select an element thereof, means for performing acts, or a machine readable medium including instructions that when performed by a machine causes the machine to perform acts related to providing a category-based keyboard.

Example 1 may include subject matter such as an apparatus to provide a category-based keyboard and/or select an element thereof. The apparatus may include a display, a key module to provide one or more keys to be rendered to a user via the display, wherein at least one of the keys is to include one or more characters, a contact module to recognize one or more touch areas formed between one or more user digits and the keys, a classification module to determine one or more categories associated with at least one of the touch areas, and/or a selection module to select at least one of the characters based on the categories.

Example 2 may include the subject matter of Example 1 and further optionally is to include a display including a touch screen.

Example 3 may include the subject matter of any of Example 1 to Example 2 and further optionally is to include the key module to provide a keyboard configuration including a plurality of characters in at least one of the keys.

Example 4 may include the subject matter of any of Example 1 to Example 3 and further optionally is to include the key module to provide a keyboard configuration including a reduction in the number of keys and/or an enlargement of the size of the keys relative to a pre-existing keyboard configuration based on at least one of the categories.

Example 5 may include the subject matter of any of Example 1 to Example 4 and further optionally is to include the contact module to determine one or more qualities of at least one of the touch areas.

Example 6 may include the subject matter of any of Example 1 to Example 5 and further optionally is to include the classification module to determine a category that is to include a hand category including at least one of a right hand class and a left hand class and/or a finger category including at least one of a thumb class, an index finger class, a middle finger class, a ring finger class, and a little finger class.

Example 7 may include the subject matter of any of Example 1 to Example 6 and further optionally is to include the selection module to use at least one of the touch areas to determine a key to be contacted and/or a character to be contacted.

Example 8 may include the subject matter of any of Example 1 to Example 7 and further optionally is to include the selection module to select at least one of the characters from a plurality of characters in at least one of the keys based on a single contact action for the key.

Example 9 may include subject matter such as a method of providing a category-based keyboard and/or selecting an element thereof. The method may include recognizing one or more touch areas formed between one or more user digits and one or more keys, wherein at least one of the keys may include one or more characters, determining one or more categories associated with at least one of the touch areas, and/or selecting at least one of the characters based on the categories.

Example 10 may include the subject matter of Example 9 and further optionally may include rendering at least one of the keys via a display.

Example 11 may include the subject matter of any of Example 9 to Example 10 and further optionally may include providing a keyboard configuration including a plurality of characters in at least one of the keys.

Example 12 may include the subject matter of any of Example 9 to Example 11 and further optionally may include providing a reduction in the number of keys and/or an enlargement of the size of the keys relative to a pre-existing keyboard configuration based on at least one of the categories.

Example 13 may include the subject matter of any of Example 9 to Example 12 and further optionally may include determining one or more qualities of at least one of the touch areas.

Example 14 may include the subject matter of any of Example 9 to Example 13 and further optionally may include determining a hand category including at least one of a right hand class and a left hand class and/or a finger category including at least one of a thumb class, an index finger class, a middle finger class, a ring finger class, and a little finger class.

Example 15 may include the subject matter of any of Example 9 to Example 14 and further optionally may include using at least one of the touch areas to determine a key contacted and/or a character contacted.

Example 16 may include the subject matter of any of Example 9 to Example 15 and further optionally may include pre-defining at least one of the categories based on one or more reference touch areas and/or pre-defining one or more selection rules to select the characters.

Example 17 may include the subject matter of any of Example 9 to Example 16 and further optionally may include facilitating a work product based on the characters selected and/or facilitating access to secure content based on the characters selected.

Example 18 may include subject matter such as at least one computer-readable medium including one or more instructions that when executed on one or more computing devices causes the one or more computing devices to perform the method of any of Example 9 to Example 17.

Example 19 may include subject matter such as at least one apparatus including means for performing the method of any of Example 9 to Example 17.

Example 20 may include subject matter such as at least one system including means for performing the method of any of Example 9 to Example 17.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing." "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carry the meaning of "one or more" or "at least one". In addition, as used in this application and in the claims, a list of items joined by the terms "one or more of" and "at least one of" can mean any combination of the listed terms. For example, the phrase "one or more of A, B or C" can mean A; B; C; A and B; A and C; B and C; or A, B and C.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, the specification, and following claims.

I claim:

1. An apparatus to provide a keyboard or select an element thereof comprising:

a display;

a key module to provide one or more keys to be rendered to a user via the display, wherein at least one key of the one or more keys is to include two or more characters;

a contact module to recognize a touch area formed between one or more user digits and a single key to choose a character from among two or more characters of the single key, wherein the single key is to include two or more partitioned sets of characters, and wherein each set of characters is to include a plurality of characters;

a classification module to determine, in response to the touch area being formed to choose the character, one or more classes for the one or more user digits used to form the touch area between the one or more user digits and the single key; and a selection module to:

select the character from among the two or more characters of the single key based on the one or more classes for the one or more user digits used to form the touch area between the one or more user digits and the single key, wherein a first character of the two or more characters is to be selected when the touch area is to be formed between one or more user digits of a left hand and the single key, independent of contact with the display by a digit of the left hand outside of the single key, and independent of contact with the display by a digit of the right hand, and wherein a second character of the two or more characters is to be selected when the touch area is to be formed between the one or more user digits of a the right hand and the single key, independent of contact with the display by a digit of the right hand outside of the single key, and independent of contact with the display by a digit of the left hand;

select a first set of characters from among the two or more partitioned sets of characters and one of the first character or the second character from among the first set of characters when the touch area is to be formed between one of the one or more user digits of the left hand or the one or more user digits of the right hand and the single key; and select a second set of characters from among the two or more partitioned sets of characters and the other of the first character or the second character from among the second set of characters when the touch area is to be formed between the other of the one or more user digits of the left hand or the one or more user digits of the right hand and the single key.

2. The apparatus of claim 1, wherein the display includes a touch screen.

3. The apparatus of claim 1, wherein the contact module is to determine one or more qualities of the touch area.

4. The apparatus of claim 1, wherein the selection module is to use the touch area to determine one or more of the single key is to be contacted or the first character or the second character is to be contacted, and is to select the first character or the second character based on a single contact action for the single key.

5. The apparatus of claim 1, wherein the classification module is to determine that at least one of the classes is to include one or more of a right hand class, a left hand class, a thumb class, an index finger class, a middle finger class, a ring finger class, and a little finger class.

6. A method to provide a keyboard or select an element thereof comprising:

recognizing a touch area formed between one or more user digits and a single key that includes two or more characters, wherein the single key includes two or more partitioned sets of characters, and wherein each set of characters includes a plurality of characters;

determining, in response to the touch area being formed between one or more user digits and the single key to choose a character from among the two or more characters, one or more classes for the one or more user digits used to form the touch area between the one or more user digits and the single key;

selecting the character from among the two or more characters of the single key based on the one or more classes for the one or more user digits used to form the touch area between the one or more user digits and the single key, wherein a first character of the two or more characters is selected when the touch area is formed between one or more user digits of a left hand and the single key, independent of contact with a display by a digit of the left hand outside of the single key, and independent of contact with the display by a digit of the right hand, and wherein a second character of the two or more characters is selected when the touch area is formed between the one or more user digits of a the right hand and the single key, independent of contact with the display by a digit of the right hand outside of the single key, and independent of contact with the display by a digit of the left hand;

selecting a first set of characters from among the two or more partitioned sets of characters and one of the first character or the second character from among the first set of characters when the touch area is formed between one of the one or more user digits of the left hand or the one or more user digits of the right hand and the single key; and selecting a second set of characters from among the two or more partitioned sets of characters and the other of the first character or the second character from among the second set of characters when the touch area is to be formed between the other of the one or more user digits of the left hand or the one or more user digits of the right hand and the single key.

7. The method of claim 6, further including providing one or more of a reduction in the number of keys or an enlargement of the size of the keys relative to a pre-existing keyboard configuration based on at least one of the classes.

8. The method of claim 6, further including determining one or more qualities of touch area, the one or more qualities including at least one of a size and a shape.

9. The method of claim 6, further including using the touch area to determine one or more of the single key is contacted or the first character or the second character is contacted.

10. The method of claim 6, further including selecting the first character or the second character based on a single contact action for the single key.

11. The method of claim 6, further including pre-defining one or more of at least one of the classes based on one or more reference touch areas or one or more selection rules to select the first character or the second character.

12. The method of claim 6, further including facilitating one or more of a work product based on the first character or the second character selected or access to secure content based on the first character or the second character selected.

13. The method of claim 6, further including determining that at least one of the one or more classes includes one or more a right hand class, a left hand class, a thumb class, an index finger class, a middle finger class, a ring finger class, and a little finger class.

14. At least one non-transitory computer-readable medium comprising one or more instructions that when executed on a computing device cause the computing device to:

provide one or more keys to be rendered to a user via the display, wherein at least one key of the one or more keys is to include two or more characters wherein the single key is to include two or more partitioned sets of characters and wherein each set of characters is to include a plurality of characters;

recognize a touch area formed between one or more user digits and a single key to choose a character from among two or more characters of the single key;

determine, in response to the touch area being formed to choose the character, one or more classes for the one or more user digits used to form touch area between the one or more user digits and the single key;

select the character from among the two or more characters of the single key based on the one or more classes for the one or more user digits used to form the touch area between the one or more user digits and the single key, wherein a first character of the two or more characters is to be selected when the touch area is to be formed between one or more user digits of a left hand and the single key, independent of contact with a display by a digit of the left hand outside of the single key, and independent of contact with the display by a digit of the right hand, and wherein a second character of the two or more characters is to be selected when the touch area is to be formed between the one or more user digits of the right hand and the single key, independent of contact with the display by a digit of the right hand outside of the single key, and independent of contact with the display by a digit of the left hand;

select a first set of characters from among the two or more partitioned sets of characters and one of the first character or the second character from among the first set of characters when the touch area is to be formed between one of the one or more user digits of the left hand or the one or more user digits of the right hand and the single key; and select a second set of characters from among the two or more partitioned sets of characters and the other of the first character or the second character from among the second set of characters when the touch area is to be formed between the other of the one or more user digits of the left hand or the one or more user digits of the right hand and the single key.

15. The at least one non-transitory computer-readable medium of claim 14, wherein the instructions, if executed, cause a computing device to determine one or more qualities of the touch area.

16. The at least one non-transitory computer-readable medium of claim 14, wherein the instructions, if executed, cause a computing device to:

use the touch area to determine one or more of the single key is to be contacted or the first character or the second character is to be contacted; and select the first character or the second character based on a single contact action for single key.

17. The at least one non-transitory computer-readable medium of claim 14, wherein the instructions, if executed, cause a computing device to determine that at least one of the classes is to include one or more of a right hand class, a left hand class, a thumb class, an index finger class, a middle finger class, a ring finger class, and a little finger class.

18. An apparatus to provide a keyboard or select an element thereof comprising:

a key module to provide one or more keys, wherein at least one key of the one or more keys is to include two or more characters, wherein the single key is to include two or more partitioned sets of characters, and wherein each set of characters is to include a plurality of characters;

a contact module to recognize a touch area formed between one or more user digits and a single key to choose a character from among the two or more characters of the single key;

a classification module to determine, in response to the touch area being formed to choose the character, one or more classes for the one or more user digits used to form the touch area between the one or more user digits and the single key; and a selection module to:

select the character from among the two or more characters of the single key based on the one or more classes for the one or more user digits used to form the touch area between the one or more user digits and the single key, wherein a first character of the two or more characters is to be selected when the touch area is to be formed between one or more user digits of a left hand and the single key, independent of contact with a display by a digit of the left hand outside of the single key, and independent of contact with the display by a digit of the right hand, and wherein a second character of the two or more characters is to be selected when the touch area is to be formed between the one or more user digits of the right hand and the single key, independent of contact with the display by a digit of the right hand outside of the single key, and independent of contact with the display by a digit of the left hand select a first set of characters from among the two or more partitioned sets of characters and one of the first character or the second character from among the first set of characters when the touch area is to be formed between one of the one or more user digits of the left hand or the one or more user digits of the right hand and the single key; and select a second set of characters from among the two or more partitioned sets of characters and the other of the first character or the second character from among the second set of characters when the touch area is to be formed between the other of the one or more user digits of the left hand or the one or more user digits of the right hand and the single key.

* * * * *

UNITED STATES PATENT AND TRADEMARK OFFICE

CERTIFICATE OF CORRECTION

PATENT NO. : 9,703,478 B2
APPLICATION NO. : 14/128931
DATED : July 11, 2017
INVENTOR(S) : Wenlong Yang It is certified that error appears in the above-identified patent and that said Letters Patent is hereby corrected as shown below:

At Column 21, Claim number 1, Line number 66, after “of”, delete “the”, and insert -- a --

At Column 22, Claim number 1, Line number 2, after “of”, delete “a”

At Column 22, Claim number 6, Line number 58, after “digit of”, delete “the”, and insert -- a --

At Column 22, Claim number 6, Line number 61, after “of”, delete “a”

At Column 23, Claim number 14, Line number 48, delete “characters and”, and insert -- characters, and --

At Column 23, Claim number 14, Line number 67, after “of”, delete “the”, and insert -- a --

Signed and Sealed this
Twenty-seventh Day of February, 2018

Andrei Iancu
*Director of the United States Patent and Trademark Office*